United States Patent [19]
Kato et al.

[11] Patent Number: 5,617,643
[45] Date of Patent: Apr. 8, 1997

[54] ELECTROLYSIS ELECTRODE PLATE FLATNESS MEASURING APPARATUS

[75] Inventors: Yoshinobu Kato, Mitaka; Mitsuharu Oonishi; Hideaki Kobayashi, both of Niihama, all of Japan

[73] Assignee: Sumitomo Metal Mining Company, Limited, Tokyo, Japan

[21] Appl. No.: 360,320

[22] Filed: Dec. 21, 1994

[30] Foreign Application Priority Data

Dec. 24, 1993 [JP] Japan .................................. 5-348232

[51] Int. Cl.⁶ .................. G01B 11/30; G01B 11/06
[52] U.S. Cl. .............. 33/533; 33/DIG. 21; 250/559.45; 250/223 R; 356/371
[58] Field of Search .................. 33/1 M, 227, 262, 33/286, 501.02, 533, 709, DIG. 21; 250/559.38, 559.48, 223 R; 356/371

[56] References Cited

U.S. PATENT DOCUMENTS

| | | | |
|---|---|---|---|
| 3,792,930 | 2/1974 | Obenreder | 356/371 |
| 4,233,745 | 11/1980 | Ramon et al. | 33/533 |
| 4,271,699 | 6/1981 | Williamson | 33/501.02 |
| 5,233,761 | 8/1993 | Guaraldi et al. | 33/286 |
| 5,293,216 | 3/1994 | Moslehi | 356/371 |

FOREIGN PATENT DOCUMENTS

| | | | |
|---|---|---|---|
| 1-49907 | 2/1989 | Japan | 33/533 |
| 2-82108 | 3/1990 | Japan | 33/533 |
| 4-93709 | 3/1992 | Japan | 33/533 |

*Primary Examiner*—G. Bradley Bennett
*Attorney, Agent, or Firm*—Watson Cole Stevens Davis, P.L.L.C.

[57] ABSTRACT

An apparatus for continuously and automatically measuring deformation and warp of a shaped electrode plate for electrolysis before the electrode plate includes means for lifting shaped electrode plates 1 hanging from crossbars 2 one by one to a predetermined measurement position by a suspending apparatus having a hanger mechanism and adjusting it about a measurement vertical plane position; for so freely suspending the electrode plate 1 vertically about the underside of a crossbar 2 that the electrode plate is not subject to deformation caused by the influence of its own weight or external forces; and a computing device 23 for continuously scanning the flatness of the electrode plate 1 by a moving mechanism which moves sensors 11a, 11b which measure distances between the electrode plate 1 and planes parallel to and facing the front and rear sides of the electrode plate 1 respectively without making contact with the electrode plate horizontally and vertically over those planes and A/D converting and analyzing measurement data obtained by this scanning.

3 Claims, 2 Drawing Sheets

ELECTROLYSIS ELECTRODE PLATE FLATNESS MEASURING APPARATUS

BACKGROUND OF THE INVENTION

1. Field of the Invention

This invention relates to an apparatus for continuously measuring the flatness, that is, the verticality and flatness and thickness in a suspended state, of electrode plates such as anodes or cathodes for electrolysis used in the electrolytic refining of copper or nickel or the like.

2. Description of the Prior Art

The method generally used in the electrolytic refining of for example copper is to so suspend a starting copper anode and a starting copper cathode in an electrolytic cell that they face each other at a fixed distance apart, the so called pitch between electrodes. It is important that the suspended anode and cathode be a fixed distance apart over the entirety of their facing surfaces, and when either of the electrode plates is deformed or is of nonuniform thickness, abnormal electrodeposition occurs where the inter-electrode is short, and in extreme cases the anode and the cathode short-circuit. This kind of abnormal electrodeposition results in poor electrolytic copper quality, and at this time the electrical current efficiency is reduced by short-circuiting. For this reason it is required that the anodes and cathodes have good flatness and be of uniform thickness in their suspended state in the electrolytic cell.

There is not yet any means by which the flatness and thickness of this kind of electrode plate can be measured industrially, and at present the only correction being performed is that of a warp great enough to be visually discerned. An apparatus for measuring cathode warp using a non-contact sensor is disclosed in for example, Japanese Laid-Open Utility Model Publication No. S.64-33607, but because in this apparatus a single sensor is swept over the electrode plate and the distance between the electrode plate surface and the sensor is measured, the measuring time is long and consequently handling numerous electrode plates is in practice problematic and furthermore there is the shortcoming that there is no provision for measuring the thickness of the electrode plate.

SUMMARY OF THE INVENTION

Accordingly, it is an object of this invention to provide an electrolysis electrode plate flatness measuring apparatus wherein the above-mentioned problems are solved. That is in this invention an electrode plate for electrolysis is put under the same conditions as those under which it is to be suspended in an electrolytic cell, the flatness in the freely suspended state required of the electrode plate is continuously measured on both sides of the electrode plate, ample data for analyzing the state of deformation and warp of the electrode plate is collected, and a small computer is used for simultaneously analyzing this data.

In this invention, any one electrode plate from among a sequence of electrode plates transported along a conveyor is lifted by a drive apparatus having a vertically movable hanger mechanism, the electrode plate is suspended vertically, and simultaneous measurement is performed in a short time by sensors which, without making contact with the electrode plate, measure the distance between the electrode plate and planes parallel to and facing the front and rear sides thereof by being moved over these planes in the horizontal and vertical directions; laser sensors are used for these sensors, servo motors whose constant speed driving in order to not producing rocking and positioning precision is certain are used for the mechanisms driving the sensors, and a mechanism wherein the electrode plate is held by means of a cylinder is used to make the distance between the sensors and the electrode plate constant at all times during measurement.

DETAILED DESCRIPTION OF THE PREFERRED EMBODIMENT

Figure 1:
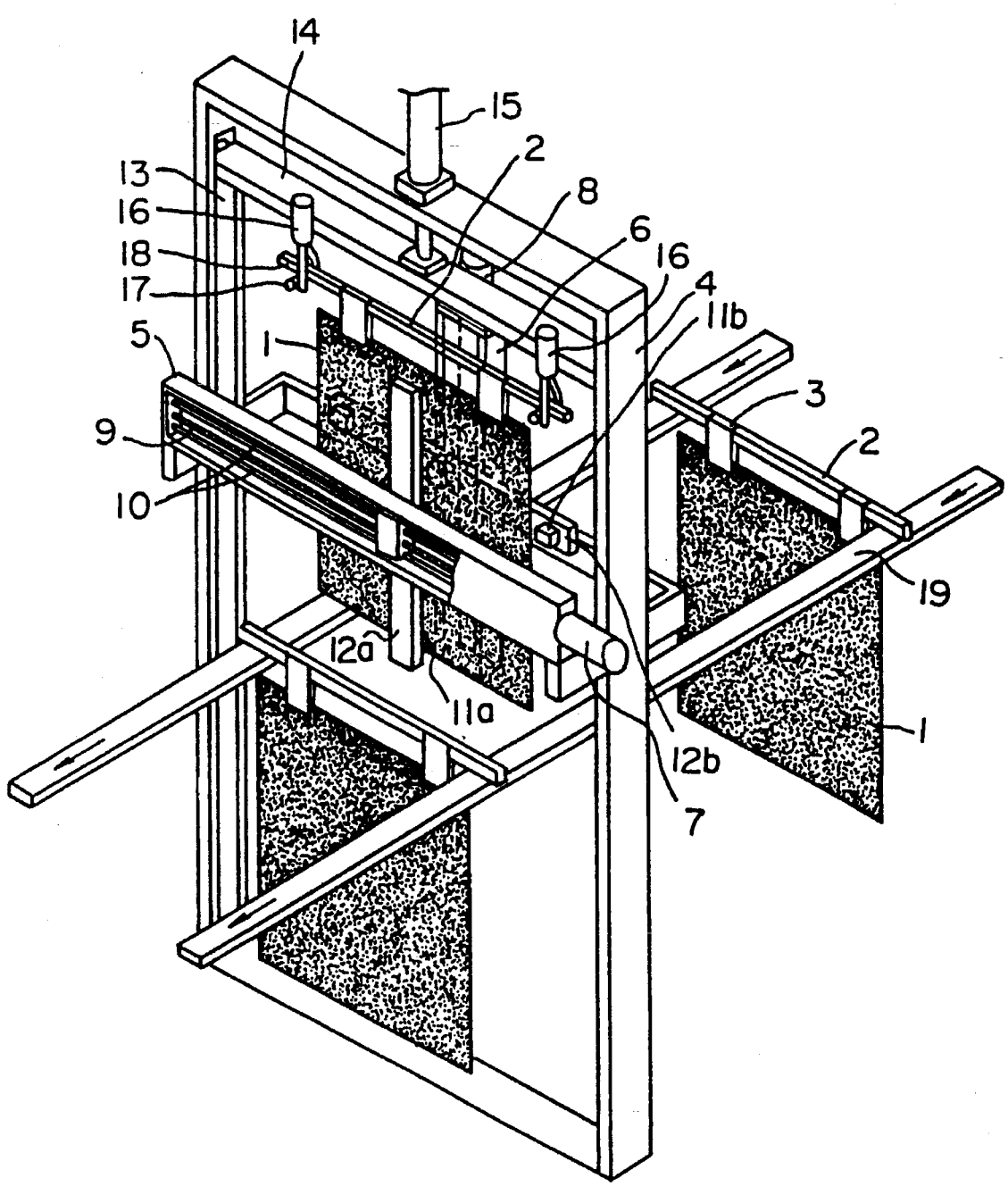
FIG. 1 is a perspective view of a mechanical section of an apparatus according to the invention.

In FIG. 1, electrode plates 1 are suspended vertically from crossbars 2 via hangers 3, and both ends of the crossbars 2 rest on and are transported by a transport conveyor 19.

A vertical main frame 4 is mounted parallel with and around the electrode plates 1, and a transverse axis frame 5 and a vertical axis frame 6 are mounted respectively horizontally and vertically on either side of the main frame 4. The transverse axis frame 5 and the vertical axis frame 6 are of the same construction, and respectively have servo motors 7 and 8 mounted at one end. A screw shaft 9 is fitted to the servo motor 7 in the direction of movement of sensors 11a, and slide shafts 10 are mounted parallel to and above and below the screw shaft 9. A sensor beam 12a is mounted vertically on the screw shaft 9 and the slide shafts 10, and a plurality of sensors 11a, each of which measures the distance between itself and the surface of the cathode 1 without making contact therewith, are mounted on the sensor beam 12a and are movable therewith. Although not shown in the drawing, a similar screw shaft and slide shafts and a plurality of sensors 11b fitted to a horizontal sensor beam 12b are mounted on the vertical axis frame 6 also, and each of the sensors 11b measures the distance between itself and the surface of the cathode 1 without making contact therewith.

Vertical raising and lowering guide grooves 13 are provided in the inner sides of the side portions of the main frame 4 and a raising and lowering frame 14 is fitted in the raising and lowering guide grooves 13 slidably up and down, and the raising and lowering frame 14 is attached to a raising and lowering cylinder 15 mounted on the upper portion of the main frame 4 and can be raised and lowered thereby. Rotary actuators 16 are mounted on the left and right sides of the raising and lowering frame 14, and hanging hooks 17 are mounted on the rotary actuators 16 pivotally through 90°. Also, bar pressers 18 are so fitted to the rotary actuators 16 that a crossbar 2 can be held between the bar pressers 18 and the hanging hooks 17.

The basic operation of the mechanical section of the apparatus of the invention will now be explained.

The electrode plates 1 are transported by the transport conveyor 19 and arbitrary electrode plates 1 to be measured can be freely selected by numbers of plates or set by time. The apparatus is so programmed that an electrode plate 1 to be measured stops in front of the apparatus proper. At this time, the raising and lowering frame 14 of the suspending apparatus is lowered with the ends of the hanging hooks 17 (claws which catch the crossbar 2) and the bar pressers 18 open until the ends of the bar pressers 18 are just below the crossbar 2.

Next, the rotary actuators 16 are activated and the hanging hooks 17 are pivoted so that the claws of the hanging-hooks 17 and the bar pressers 18 grip the crossbar 2 and with the distance between the sensors 11a, 11b and the center of the crossbar 2 fixed the cathode 1 is lifted to a predetermined measurement position.

When all is ready for measurement of the electrode plate 1, the servo motors 7 and 8 are activated and the sensors 11a, 11b start moving and measuring the distances between themselves and the electrode plate 1. When measurement in the horizontal and vertical directions is finished the sensor beams 12a, 12b return to their original positions and standby until all is ready for measurement of the next electrode plate 1.

When measurement is finished the transport conveyor 19 is stopped again, the raising and lowering cylinder 15 lowers the raising and lowering frame 14, the crossbar 2 is laid on the transport conveyor 19, and the raising and lowering cylinder 15 raises the raising and lowering frame 14. At this time, the hanging hooks 17 are pivoted through 90° by the rotary actuators 16 so that the claws of the hanging hooks 17 do not catch the crossbar 2 again. The transport conveyor 19 is started again and the apparatus stands-by until the next electrode plate 1 to be measured arrives.

In order to make the mechanical section operate as described above, the measurement data is A/D converted by an A/D converter module, taken into a computing device and data-inputted. A block diagram thereof is shown in FIG. 2.

Figure 2:
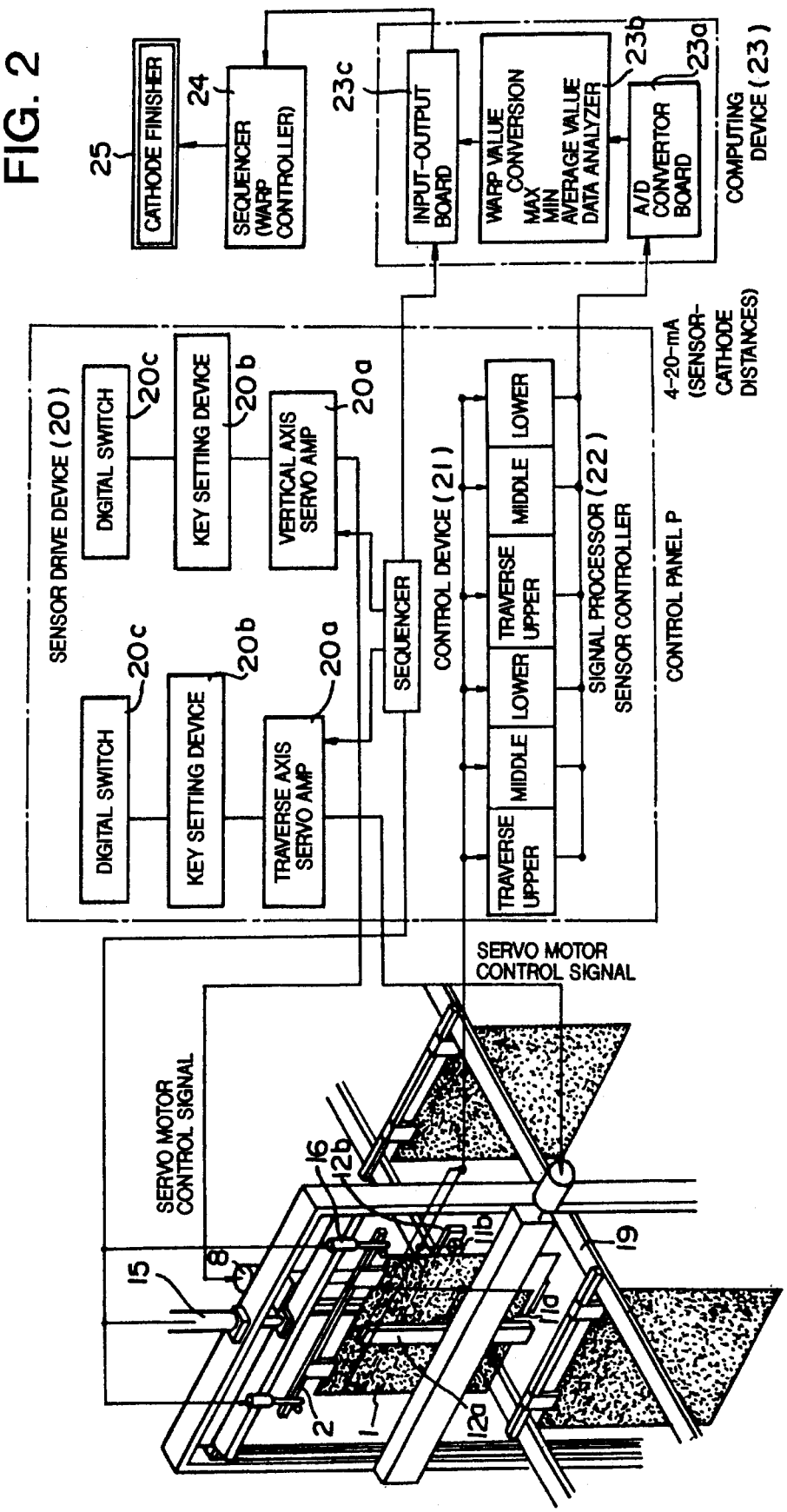
FIG. 2 is a view of the overall construction of an apparatus according to the invention, including a block diagram.

In FIG. 2, a sequencer 21 inside a control panel p directs a chain of operations wherein a crossbar 2 from which an electrode plate 1 is suspended is gripped, this is lifted up to a predetermined position and supported there, the transverse axis servo motor 7 and the vertical axis servo motor 8 are driven and data consisting of distances between the sensors 11a, 11b and the electrode plate 1 is collected. After the data is collected, the electrode plate 1 is lowered, the transport conveyor 19 is driven for a predetermined distance (this drive is not shown in the drawings), and the crossbar 2 of the next electrode plate 1 is gripped. That is, the sequencer 21 performs so-called sequence control.

A sensor drive device 20, based on commands from the control device 21, drives in the transverse and vertical directions respectively the two sensor beams 12a, 12b on which three sensors 11a and three sensors 11b are arrayed respectively in the horizontal and vertical directions, and comprises transverse axis and vertical axis servo amplifiers 20a and a key setting device 20b and a digital switch 20c for each amplifier; the sensor beams 12a and 12b perform the measurement while each moves from one end of the electrode plate 1 to the other end and rapidly return to their original positions when the measurement is finished. This operation is directed by the control device 21, and setting of the start and end positions and the drive speeds and the return speeds is performed using the key setting devices 20b.

During the operation of the sensor drive device 20, the measured distance data is continuously received by a signal processor 22 based on sensor controllers and inputted via an A/D converter board 23a to a computing device 23; data analysis to determine the nature of the curved state of the electrode plate 1 is performed by an analyzer 23b and also the thickness of the electrode plate at the nine points at which front and rear sensors 11a and 11b become aligned is simultaneously measured.

These computed results can be printed out as data on the electrode plate from an input-output board 23c operating in conjunction with the control device 21.

It is also possible to correct warping such as bending using this data. That is, the warp data can be sent through a sequencer (warp controller) 24 to a cathode finisher 25 for carrying out this correction. Feedback for issuing a warning when an abnormality is detected as the measurement data is inputted, analyzing the measurement data and directing correction roller adjustments, etc., is also possible.

This invention can be applied not only to electrode plates before they are used for electrolysis but also of course to electrode plates part-way through electrolysis or after electrolysis. By connecting the measurement results with the positioning of electrode plates in an electrolytic cell they can also be used to help find abnormalities in the electrolytic cell itself. For example when the amount of electrodeposition in a certain location is small it indicates that there is some ordinary damage, and measures can be taken to repair this location before the next electrolysis.

An apparatus according to the invention can also be used for measuring an anode.

As described above in detail, because an apparatus according to the invention inputs measurement data as analogue data, the state of an electrode plate can be analyzed accurately. Also, because sensors are provided on both sides of the electrode plate, the states of both sides of the electrode plate and the states in the horizontal and vertical directions can be detected. Thus it is possible to detect defective electrode plates and correct the causes of the defectiveness and thereby improve the product quality.

What is claimed is:

1. An apparatus for measuring the flatness of electrode plates used in electrolysis, said apparatus comprising:

suspension means including a crossbar and gripping means attached thereto for gripping a generally vertically oriented electrode plate adjacent an upper edge thereof and for moving the electrode plate from a lower position to an upper measurement position, sensor means respectively located on opposite first and second sides of said electrode plate and movable in respective planes extending parallel to said opposite first and second sides of said electrode plate when in said upper measurement position for measuring distances between said sensor means and said opposite sides of said electrode plate, drive means for moving said sensor means vertically and horizontally in said planes relative to said electrode plate so as to scan said respective first and second sides of said electrode plate, and a computing device for controlling said drive means and for receiving signals from said sensor means, said computer means determining the flatness of said opposite first and second sides of said electrode plate.

2. An apparatus according to claim 1, wherein said suspension means includes a vertical main frame and a movable frame vertically movable within said main frame, and wherein said suspension means includes rotary actuators attached to said movable frame for gripping said crossbar and vertically moving said crossbar and an electrode plate to which said crossbar is attached.

3. An apparatus according to claim 1, wherein said sensor means each comprise a plurality of sensors mounted on a beam and wherein said drive means comprise slide shafts along which said beam is movable, a screw shaft for moving said beam along said slide shafts, and a drive motor for rotating said screw shaft.

* * * * *